United States Patent
Wu et al.

[11] Patent Number: 6,137,239
[45] Date of Patent: Oct. 24, 2000

[54] ELECTRONIC BALLAST WITH SELECTIVE LOAD CONTROL

[75] Inventors: Ming Liang Wu, Schaumburg; Donald G. Huvaere, Palatine; Peter W. Shackle, Arlington Heights, all of Ill.

[73] Assignee: Energy Savings, Inc., Schaumburg, Ill.

[21] Appl. No.: 09/372,201

[22] Filed: Aug. 11, 1999

[51] Int. Cl.$^7$ ...................................................... G05F 1/00
[52] U.S. Cl. ........................ 315/291; 315/294; 315/307; 315/324
[58] Field of Search ..................................... 315/291, 294, 315/307, 324, 312, 308, 299, 301, 293, 313

[56] References Cited

U.S. PATENT DOCUMENTS

| | | | |
|---|---|---|---|
| 5,177,409 | 1/1993 | Nilssen | 315/293 |
| 5,373,218 | 12/1994 | Konopka | 315/291 |
| 5,680,015 | 10/1997 | Bernitz | 315/291 |
| 5,729,098 | 3/1998 | Konopka et al. | 315/307 |
| 5,798,620 | 8/1998 | Wacyk et al. | 315/307 |
| 5,808,423 | 9/1998 | Li et al. | 315/313 |
| 5,923,128 | 7/1999 | Canova | 315/291 |
| 5,925,990 | 7/1999 | Crouse et al. | 315/307 |
| 5,973,455 | 10/1999 | Mirskiy | 315/105 |
| 6,023,132 | 2/2000 | Crouse et al. | 315/307 |
| 6,034,489 | 3/2000 | Weng | 315/307 |

*Primary Examiner*—Hoanganh Le
*Assistant Examiner*—Trinh Vo Dinh
*Attorney, Agent, or Firm*—Paul F. Wille

[57] ABSTRACT

A microprocessor controlled ballast includes a single front end and a plurality of inverters separately controlled by a single microprocessor. Lamps are operated in groups according to separate line inputs to the ballast.

16 Claims, 4 Drawing Sheets

ELECTRONIC BALLAST WITH SELECTIVE LOAD CONTROL

BACKGROUND OF THE INVENTION

This invention relates to electronic ballasts for gas discharge lamps and, in particular, to an electronic ballast that independently powers two or more lamps under external control.

A gas discharge lamp, such as a fluorescent lamp, is a non-linear load to a power line, i.e. the current through the lamp is not directly proportional to the voltage across the lamp. Current through the lamp is zero until a minimum voltage is reached, then the lamp begins to conduct. Once the lamp conducts, the current will increase rapidly unless there is a ballast in series with the lamp to limit current.

A resistor can be used as a ballast but a resistor consumes power, thereby decreasing efficiency, measured in lumens per watt. A "magnetic" ballast is an inductor in series with the lamp and is more efficient than a resistor but is physically large and heavy. A large inductor is required because impedance is a function of frequency and power lines operate at low frequency (50–60 Hz.)

An electronic ballast typically includes a rectifier for changing the alternating current (AC) from a power line to direct current (DC) and an inverter for changing the direct current to alternating current at high frequency, typically 40–65 kHz. Because the frequency of the inverter is much higher than 50–60 Hz., the inductors for an electronic ballast are much smaller than the inductor in a magnetic ballast.

Some ballasts include a boost circuit between the rectifier and the inverter. As used herein, a "boost" circuit is a circuit that increases the DC voltage, e.g. from approximately 170 volts (assuming a 120 volt input) to 300 volts or more, for operating a lamp and for providing power factor correction. "Power factor" is a figure of merit indicating whether or not a load in an AC circuit is equivalent to a pure resistance, i.e. indicating whether or not the voltage and current are in phase. It is preferred that the load be the equivalent of a pure resistance (a power factor equal to one). The boost circuit, the inverter, or both, can be self-oscillating, triggered, or driven.

It is known in the art to control an electronic ballast with a microprocessor. U.S. Pat. No. 5,680,015 (Bernitz et al.) discloses a ballast for a high intensity discharge lamp wherein a microprocessor controls a driven half-bridge inverter having a series resonant, direct coupled output. U.S. Pat. No. 5,925,990 (Crouse et al.) discloses controlling a ballast for gas discharge lamps and for monitoring the operation of the lamps.

Despite the technology contained in an electronic ballast, the ballast is only part of a larger system including lamps and fixtures. In many installations, it is commonplace to have room lighting controlled by two switches. Typically, one switch operates one of three fluorescent lamps and the other switch operates the remaining two lamps. The intention is that the full light output is not always required and hence energy can be saved by having reduced light output during parts of the day or evening.

Frequently, the way to separately control lamps is by having two three-lamp fixtures operated by three two-lamp ballasts or else have one two-lamp ballast and one four-lamp ballast. Each ballast operates lamps in both fixtures. A frequent arrangement is to have the center lamps in each fixture powered by a two lamp ballast in one of the fixtures. The remaining lamps are either operated by one four-lamp ballast in one fixture or else by a two-lamp ballast in each fixture. These configurations are pre-assembled at the factory in the form of a master fixture, a satellite fixture and a "whip" or connecting conduit that extends between two fixtures. The fixtures and whip are shipped together as components which must be assembled in the manner intended. Further, the operating voltage for each assembly has to be specified in advance.

Shipping these related pieces and assembling them in the field is commonly described as a nightmare. As one can imagine from the number of possible combinations of components, confusion and mistakes are likely and cost the manufacturers and the contractors large sums of money.

It is known in the art to toggle the power to a fluorescent lamp to provide dimming; e.g. U.S. Pat. No. 5,177,409 (Nilssen), U.S. Pat. No. 5,373,218 (Konopka et al.), and U.S. Pat. No. 5,798,620 (Wacyk et al.). This approach is not acceptable to contractors. What is needed is a single ballast that can be used in a fixture to control lamps in any desired combination, preferably at any operating voltage.

Even though electronic ballasts and other electronic devices are limited in the amount of electromagnetic energy that they can emit, a power line is not noise free. On the contrary, there is significant noise on the power lines, so much so that it is difficult to communicate reliably with a ballast. In particular, transient voltages or spikes, which are not infrequent, can cause a ballast to change mode of operation.

In view of the foregoing, it is therefore an object of the invention to provide an electronic ballast that acts like plural ballasts for controlling lighting.

A further object of the invention is to provide an electronic ballast that can reliably distinguish control signals from power line transients.

Another object of the invention is to provide an electronic ballast that can accommodate different numbers of lamps, whereby a single ballast per fixture can be used.

A further object of the invention is to provide an electronic ballast that has two, selectively actuated power line inputs for operating at least two gas discharge lamps.

SUMMARY OF THE INVENTION

The foregoing objects are achieved by a microprocessor controlled ballast including a single front end and a plurality of inverters powered by the single front end and separately controlled by a microprocessor. Lamps are operated in groups according to separate line inputs to the ballast. Each inverter converts direct current into high frequency alternating current for driving one or more lamps. A first inverter operates when low frequency alternating current is applied to a first line input and a second inverter operates when low frequency alternating current is applied to a second line input.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
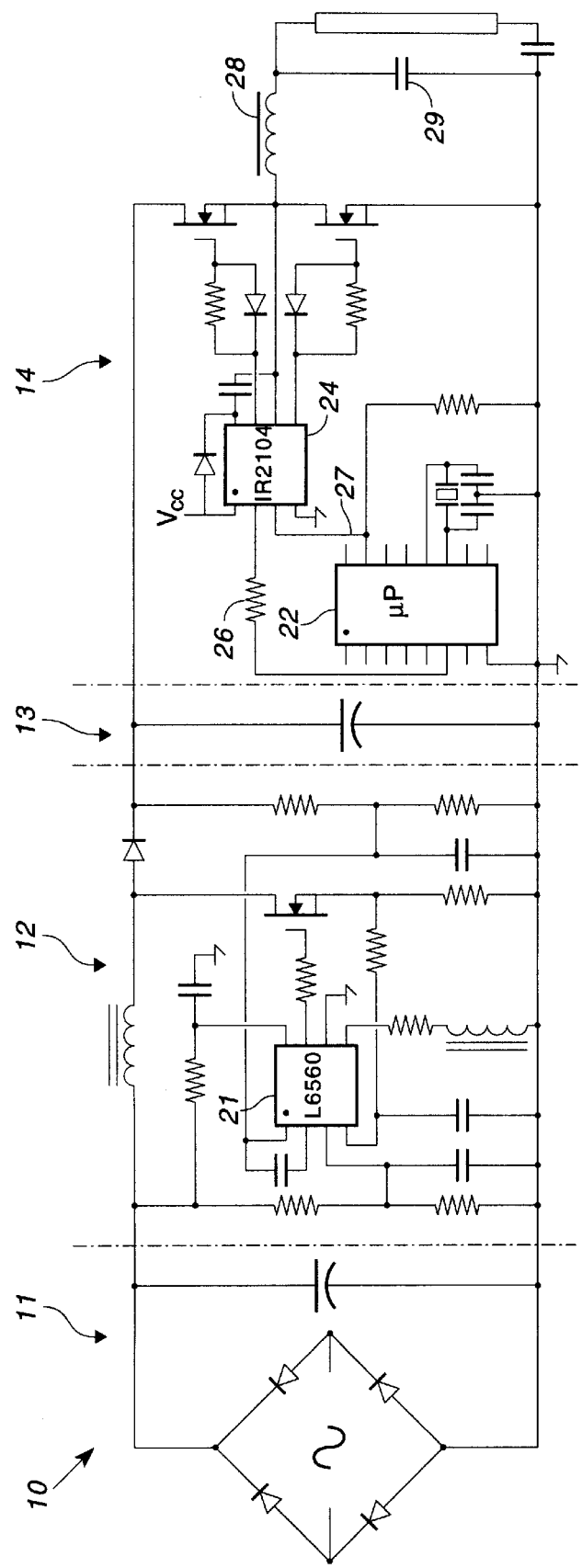
FIG. 1 is a schematic of a microprocessor controlled, electronic ballast of the prior art.

FIG. 1 illustrates a microprocessor controlled, electronic ballast constructed in accordance with the prior art. In FIG. 1, pin 1 of each integrated circuit is indicated by a small dot and the pins are numbered consecutively counterclockwise. Ballast 10 includes rectifier section 11 for producing DC from line voltage, boost section 12 for increasing the DC voltage and providing power factor correction, storage section 13 for storing energy to drive a lamp, and inverter section 14 for driving a lamp.

Boost section 12 includes boost controller 21 implemented as an L6560 power factor correction circuit as sold by SGS-Thomson Microelectronics. Boost section 12 is essentially the same as the circuit recommended in the data sheets accompanying the L6560 integrated circuit. Other power factor correction circuits could be used instead.

Energy storage section 13 is illustrated as including a single, so-called "bulk" capacitor. Several bulk capacitors connected in parallel could be used instead. The rectifier, boost, and bulk capacitor together are the "front end" of an electronic ballast, a converter for producing high voltage DC to power inverter 14.

Microprocessor 22 is coupled to two inputs of driver circuit 24. Specifically, high frequency pulses are coupled through resistor 26 through pin 2 of driver 24. Pin 3 of driver 24 is a disable input and is coupled to another output of microprocessor 22. In the event of a fault, disable line 27 is brought low, thereby shutting off the inverter. Inverter 14 includes a half bridge, series resonant, direct coupled output including inductor 28 and resonant capacitor 29.

Although illustrated as providing power for a single lamp, a ballast such as ballast 10 can provide power for up to four lamps. Powering a single lamp is not cost effective in most applications and does not solve the industry's problem of load control. For the reasons described above, a single ballast powering four lamps simultaneously does not solve the problem either.

Figure 2:
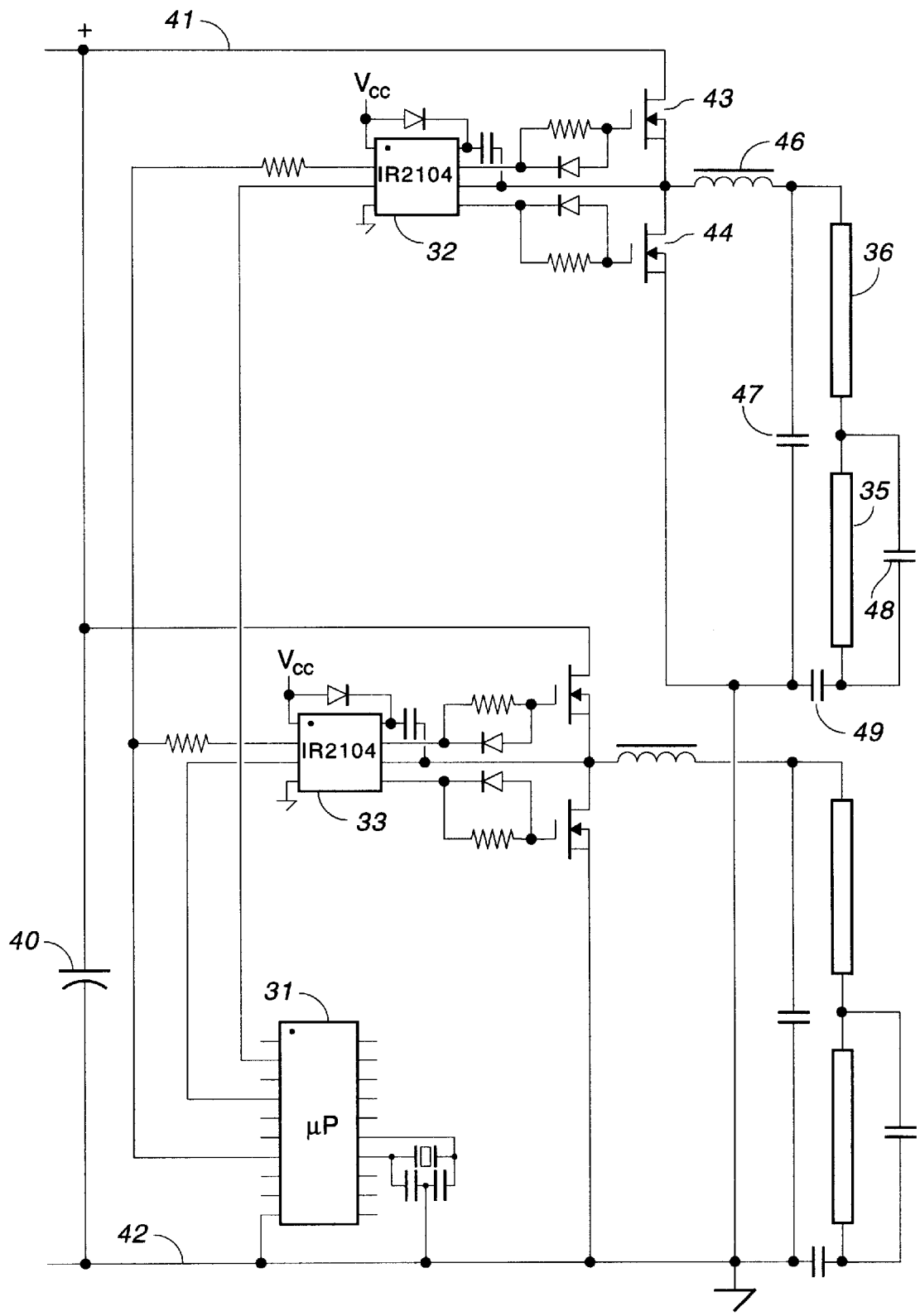
FIG. 2 is a schematic of the inverter section of a ballast constructed in accordance with one aspect of the invention.

FIG. 2 is a schematic of the inverter section of an electronic ballast constructed in accordance with the invention, wherein a microprocessor controls several outputs independently. The front end or converter section of the ballast is a resource shared among the several inverters; i.e. all the inverters are connected to a single high voltage rail.

As illustrated in FIG. 2, pin 2 of microprocessor 31 is coupled to pin 3 of driver 32 and pin 4 of the microprocessor is coupled to pin 3 of driver 33. Each driver controls its own half bridge, series resonant, direct coupled output and each output drives either one or two lamps. For example, lamp 35 can be omitted and lamp 36 will continue to function, assuming that lamp 36 is a functional lamp.

High voltage rail 41 is coupled to bulk capacitor 40 and common rail 42 is circuit ground. Transistors 43 and 44 are coupled in series between high voltage rail 41 and common. The junction of transistors 43 and 44 is coupled through inductor 46 to capacitor 47, with which the inductor resonates. The output of the inverter is taken directly from capacitor 47 and includes lamps 35 and 36 coupled in series. By-pass capacitor 48 is used to ensure that lamp 36 starts first.

Transistors 43 and 44 conduct alternately to connect inductor 46 to high voltage and then to ground. Half-bridge capacitor 49 prevents direct current from flowing through the lamps and provides an offset voltage for producing symmetrical alternating current through the lamps from the DC pulses at the junction of transistors 43 and 44.

The inverter controlled by driver 33 operates in the same manner as the inverter controlled by driver 32. Pin 7 of microprocessor 31 provides a clock signal to pin 2 of drivers 32 and 33 that sets the switching frequency of the half-bridge transistors. Control signals from pins 2 and 4 of microprocessor 31 separately enable drivers 32 and 33. Thus a ballast constructed in accordance with the invention can act as two ballasts for driving two, three, or four lamps in one or more fixtures. By sharing resources among inverters, a ballast constructed in accordance with the invention costs less than two or more ballasts providing the same function.

Figure 3:
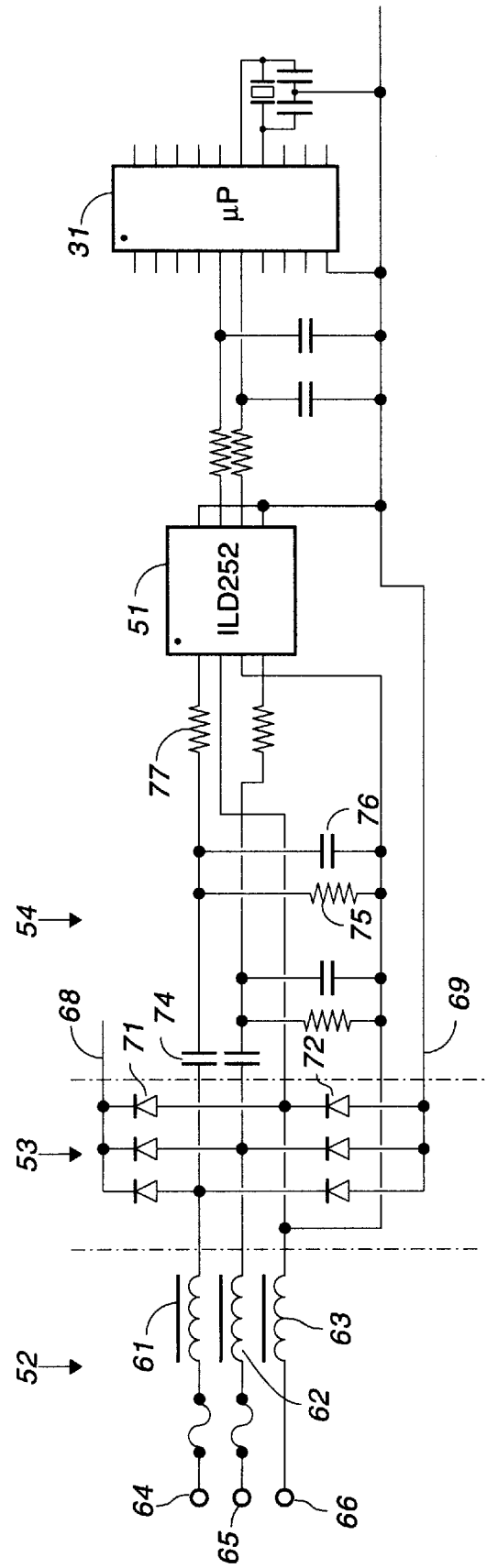
FIG. 3 is a schematic of the control circuitry constructed in accordance with another aspect of the invention.

Microprocessor 31 is told which drivers to activate by being coupled to two line inputs, as illustrated in FIG. 3. Microprocessor 31 is isolated from the AC lines or branch circuits by opto-isolator 51. It has been found that an opto-isolator is preferred to other forms of coupling because the opto-isolator provides better noise immunity, in addition to the usual role of voltage isolation.

The input to a ballast constructed in accordance with the invention includes EMI (electromagnetic interference) filter section 52, rectifier section 53, and noise filter section 54 coupled to opto-isolator 51. The combination is a reliable control input for the microprocessor.

Figure 6:
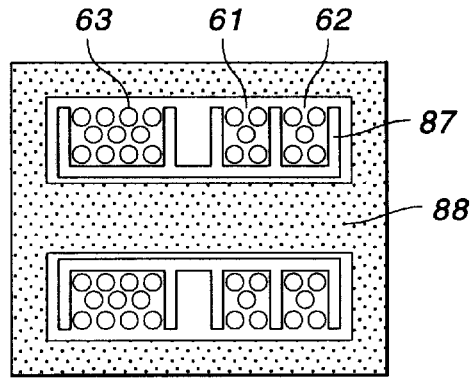
FIG. 6 is a cross-section through an EMI transformer constructed in accordance with the invention.

EMI filter section 52 includes windings 61, 62 and 63 wound on a common core, as illustrated in FIG. 6. Winding 61 is coupled through a fuse to first line input 64. Winding 62 is coupled through a fuse to second line input 65. Winding 63 is coupled to neutral input 66. Windings 61 and 62 are poled opposite to winding 63 to provide common mode EMI rejection.

Rectifier section 53 is unusual in that it contains six diodes in a bridge. Specifically, neutral input 66 is coupled to positive rail 68 and common rail 69 by diodes 71 and 72, which are shared by inputs 64 and 65 to make a full bridge rectifier for each input. Neutral input 66 is coupled directly to pins 2 and 3 of opto-isolator 51 for detecting a voltage on either input 64 or input 65.

When an AC voltage is applied to input 64, for example, the voltage is coupled through capacitor 74 and resistor 75 to neutral. Capacitor 74 and resistor 75 act as a voltage divider, reducing the voltage applied to pin 1 of opto-isolator 51 to 4–7 volts. Capacitor 76 is a large, low voltage capacitor that essentially by-passes resistor 75 at high frequencies. Thus, capacitor 74 acts as both a filter and a voltage dropping device. Resistor 77 limits the current into pin 1 of opto-isolator 51. Pin 4 of opto-isolator 51 is similarly coupled to input 65.

Figure 5:
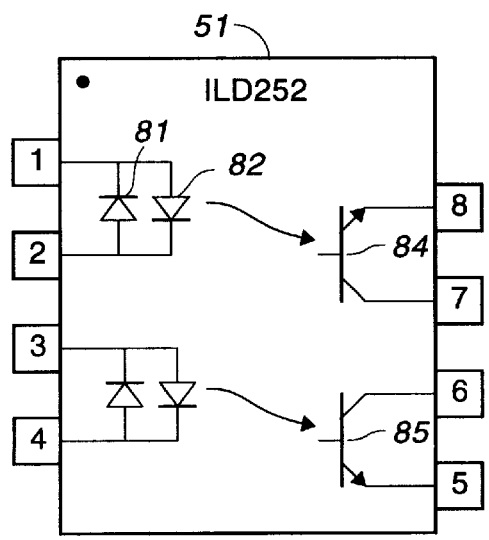
FIG. 5 is a diagram showing the pin-outs of an opto-isolator suitable for use in implementing the invention.
Figure 4:
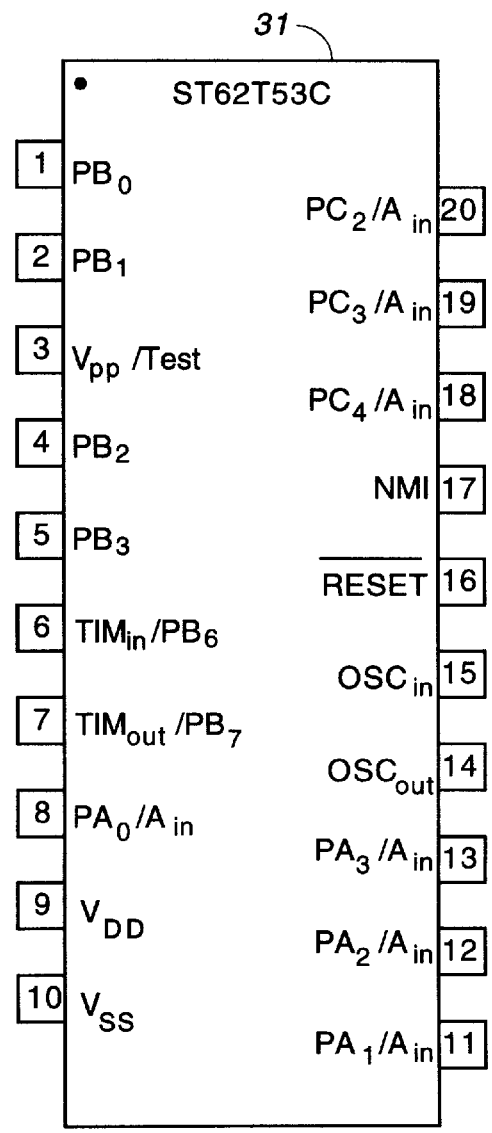
FIG. 4 is a diagram showing the pin-outs of a microprocessor suitable for use in implementing the invention.

Opto-isolator 51 is schematically illustrated in FIG. 5. A current in either direction through pins 1 and 2 causes one LED's 81 and 82 to emit light. The light is coupled to the base of transistor 84, rendering the transistor conductive. Similarly, a current in either direction through pins 3 and 4 will render transistor 85 conductive.

Referring to FIGS. 3 and 5, if transistor 84 is conductive, pin 5 of microprocessor 31 is brought low. If transistor 85 is conductive, pin 6 of microprocessor 31 is brought low. Software controlling the microprocessor causes pins 5 and 6 to be monitored and, when a low is detected, a driver is enabled. Thus, by controlling separate line inputs, a ballast can be made to act as several ballasts, thereby avoiding the cost and confusion of the prior art.

FIG. 6 is a cross-section through an EMI transformer constructed in accordance with the invention. Windings 61, 62, and 63 are wound on bobbin 87 and contained within common core 88. Bobbin 87 includes a gap between neutral winding 63 and line windings 61 and 62. The wire in neutral winding 63 is heavier than the wire in line windings 61 and 62 and is wound oppositely to the line windings. By this construction, EMI is greatly reduced in a relatively simple, compact transformer.

The invention thus provides an electronic ballast that acts like plural ballasts for controlling lighting. The ballast has two, selectively actuated power line inputs for operating at least two gas discharge lamps and reliably distinguishes control signals from power line transients. The ballast can accommodate different numbers of lamps, operating the lamps in several combinations, enabling one to use a single ballast per fixture, thereby greatly simplifying installation.

Having thus described the invention, it will be apparent to those of skill in the art that many modifications can be made with the scope of the invention. For example, more than two drivers can be controlled by the microprocessor. Fixed logic could replace microprocessor 31. One could use two free-running (self-oscillating) inverters with a disable input instead of driven inverters. Many different EMI configurations can produce similar results at the input of the ballast. For example, each input can have its own separate EMI transformer. It is also possible to couple the line inputs to the sensing pins of a microprocessor by means of a conditioning network employing, for example, resistors, capacitors, and diodes. One can switch the high voltage output of a single inverter under the control of microprocessor 31 to obtain the same result; i.e. the ballast would have more than one line input, a single converter and a single inverter. Switching the high voltage side is more costly but is not unknown in the art, e.g. U.S. Pat. No. 5,808,423 (Li et al.) discloses a control circuit coupled to the output of a ballast for turning fluorescent lamps on and off in response to interruptions of the output power from the ballast. Although the figures may imply the use of instant start lamps, the invention can be used with any type of fluorescent lamp, such as instant start, programmed start, or rapid start. One can control more than two sets of outputs and use additional line inputs to provide many lighting combinations.

What is claimed as the invention is:

1. An electronic ballast comprising:

two line voltage inputs and a neutral input;

a converter section coupled to said inputs and including a bulk capacitor coupled between a high voltage rail and common;

an inverter section coupled to said bulk capacitor and including at least two, separately controllable, AC outputs, wherein each output is adapted to be coupled to a load;

means for selectively producing AC at said outputs in response to the corresponding line voltage inputs, thereby selectively powering one or more loads.

2. The electronic ballast as set forth in claim 1 wherein said means includes a microprocessor coupled to said line inputs and to said inverter section for selectively enabling said outputs.

3. The electronic ballast as set forth in claim 2 wherein said inverter section includes at least two inverters coupled one to each of said AC outputs.

4. The electronic ballast as set forth in claim 3 wherein each inverter/output is capable of powering at least two gas discharge lamps.

5. The electronic ballast as set forth in claim 2 and further including an opto-isolator for coupling said line inputs to said microprocessor.

6. The electronic ballast as set forth in claim 1 wherein each line input and said neutral input includes an EMI filter.

7. The electronic ballast as set forth in claim 6 wherein the EMI filters on each input are magnetically coupled.

8. An electronic ballast comprising:

a single converter;

a plurality of inverters; and a single microprocessor programmed to operate said inverters individually or in combination.

9. The electronic ballast as set forth in claim 8 wherein each inverter is capable of powering at least two gas discharge lamps.

10. The electronic ballast as set forth in claim 8 and further including at least two line inputs coupled to said microprocessor.

11. The electronic ballast as set forth in claim 10 and further including an opto-isolator for coupling said two line inputs to said microprocessor.

12. The electronic ballast as set forth in claim 10 and further including a six diode bridge rectifier wherein one pair of diodes is shared between a first full bridge rectifier coupled to a first line input and a second full bridge rectifier coupled to a second line input.

13. A method for operating an electronic ballast having at least two line inputs and a neutral input and at least two, separately controllable, outputs, wherein each output can drive one or more gas discharge lamps, said method comprising the steps of:

selectively applying power to one or more line inputs in a predetermined pattern, and providing power to the outputs in accordance with the pattern in which power is applied to the line inputs.

14. The method as set forth in claim 13 wherein said providing step includes the steps of:

converting low frequency alternating current into direct current; and converting the direct current into high frequency alternating current.

15. The method as set forth in claim 14 wherein high frequency alternating current is provided to a first output when low frequency alternating current is applied to a first line input and high frequency alternating current is provided to a second output when low frequency alternating current is applied to a second line input.

16. The method as set forth in claim 14 wherein there are three lamps and wherein high frequency alternating current is provided to one lamp when low frequency alternating current is applied to a first line input, high frequency alternating current is provided to two lamps when low frequency alternating current is applied to a second line input, and high frequency alternating current is provided to three lamps when low frequency alternating current is applied to both line inputs.

* * * * *